April 21, 1925.
H. G. BYERS ET AL
1,534,027
MANUFACTURE OF CHLOROFORM
Filed Oct. 29, 1921
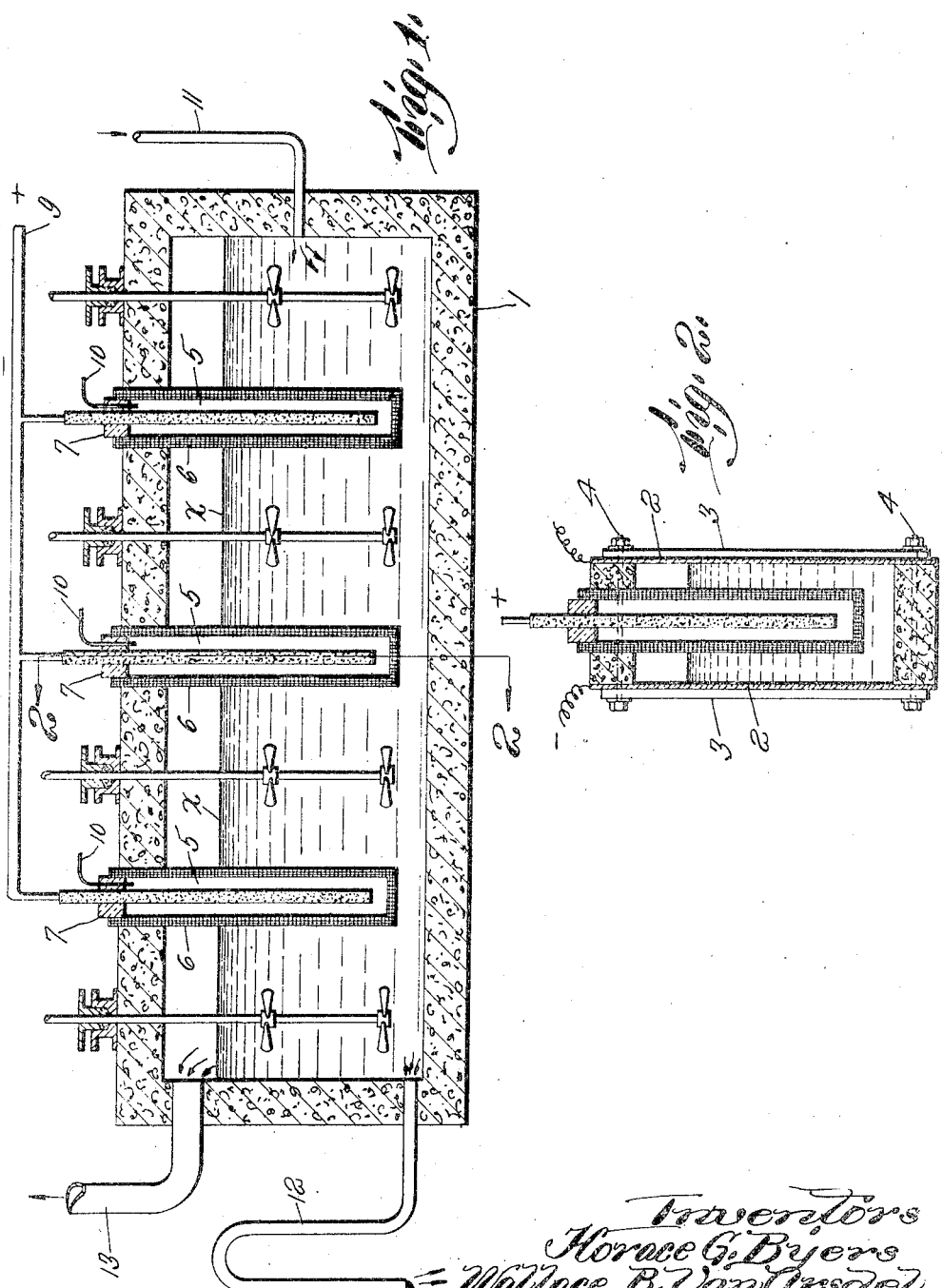

Patented Apr. 21, 1925.

1,534,027

UNITED STATES PATENT OFFICE.

HORACE G. BYERS, OF MONTCLAIR, NEW JERSEY, AND WALLACE B. VAN ARSDEL, OF BERLIN, NEW HAMPSHIRE.

MANUFACTURE OF CHLOROFORM.

Application filed October 29, 1921. Serial No. 511,435.

*To all whom it may concern:*

Be it known that we, HORACE G. BYERS and WALLACE B. VAN ARSDEL, both citizens of the United States, and residing, respectively, at Montclair, in the county of Essex and State of New Jersey, and at Berlin, in the county of Coos and State of New Hampshire, have invented new and useful Improvements in the Manufacture of Chloroform, of which the following is a specification.

This invention has relation to the production of chloroform by the reduction of carbon tetrachloride with nascent hydrogen.

In accordance with the present invention, hydrogen is produced in a nascent condition by the electrolytic decomposition of an electrolyte in which carbon tetrachloride is dissolved. We have discovered that, by dissolving carbon tetrachloride in a liquid solvent, (e. g., ethyl alcohol) and adding dilute acid, (e. g., hydrochloric or sulphuric acid,) a homogeneous mixture is produced which serves as an electrolyte, so that, when a current of electricity is passed through the electrolyte to an electrode, the nascent hydrogen liberated at the electrode will serve to reduce the carbon tetrachloride in contact therewith and form chloroform.

On the accompanying drawings, we have illustrated an electrolytic cell which may be utilized in carrying out our process,—

Figure 1 representing a longitudinal vertical section through the cell; and

Figure 2 representing a transverse vertical section therethrough.

As illustrated, the cell may comprise an acid-proof frame or cell body 1, the open sides of which are closed by lead cathode plates 2, secured in place by suitably spaced clamp bars 3, and bolts 4 which are passed laterally through the top and bottom walls of the cell. Within the cell and projecting downwardly through the top portion, there are porous alundum cups 6 to form anode chambers 5, in which is placed a dilute acid such as sulphuric acid. The upper ends of these cups are glazed or treated with sodium silicate to prevent loss of the electrolyte by evaporation, and are fastened in the upper wall of the cell body. The upper ends of the cups are closed by suitable members or closures 7, through which graphite bars to constitute anodes are passed for electrical connection with the positive conductor 9. Through each closure there leads a pipe 10 for conducting away the gases evolved at the anodes, these pipes being all connected to a suitable main not shown. The electrolyte may be supplied to the cathode compartment of the cell body through a feed pipe 11, and, if desired, the feed of the electrolyte may be regulated by any suitable means as ordinarily so that it may be delivered to the cell as needed. The cell may likewise be provided with a goose-neck overflow pipe 12 for removing the contents of the cell. The gas main is indicated at 13 for conducting away the gases liberated in the anode compartment of the cell, the level of the electrolyte being indicated at $x$. In this construction, the cathode chamber is formed by the body of the cell and the side plates or lead cathodes, and is separated by the porous cups from the anode chambers containing the dilute acid only.

In accordance with our process, the carbon tetrachloride is preferably dissolved in pure alcohol (95%), using about one volume of the former to two of the latter, and 0.3 volume of dilute sulphuric acid (one part concentrated acid to four parts of water) is added. This homogeneous mixture is placed in the cathode compartment of the electrolytic cell and dilute hydrochloric or sulphuric acid is placed in the anode compartment. An electric current of suitable voltage and amperage is passed through the cell from the anodes to the cathodes, resulting in the decomposition of the acid with the liberation of nascent hydrogen at the cathode in the presence of the carbon tetrachloride. The latter is thereby reduced to chloroform according to the following reactions:

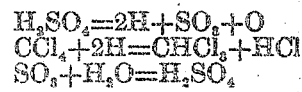

$$H_2SO_4 = 2H + SO_2 + O$$
$$CCl_4 + 2H = CHCl_3 + HCl$$
$$SO_2 + H_2O = H_2SO_3$$

The process is continued until about 10% to 15% of the tetrachloride has been reduced to chloroform, after which the liquid is drawn from the cathode compartment and is diluted with water to precipitate the tetrachloride-chloroform mixture. The alcohol is reconcentrated for reuse, and the mixture of chloroform and carbon tetrachloride is distilled for the recovery of the chloroform therefrom.

In lieu of ethyl alcohol, we may use either methyl, propyl or amyl alcohol, "petrohol" (a mixture of alcohols produced by the cracking of petroleum) acetone or glacial acetic acid.

All of these substances are solvents not only for carbon tetrachloride, but, in addition, dissolve enough water in the presence of carbon tetrachloride to provide an electrolyte having the requisite electrical conductivity.

What we claim is:—

1. The herein described process of making chloroform, which comprises electrolytically decomposing an acid and liberating nascent hydrogen in the presence of a solution of carbon tetrachloride in a solvent thereof, thereby reducing the carbon tetrachloride with the nascent hydrogen thus liberated, and separating and recovering the chloroform.

2. The herein described process of making chloroform, which comprises passing an electric current from an anode to a cathode through an alcoholic electrolyte containing a dilute acid and carbon tetrachloride, thereby decomposing the acid and liberating nascent hydrogen at the cathode in the presence of the carbon tetrachloride, reducing said carbon tetrachloride with such hydrogen to chloroform, and separating and recovering the chloroform.

3. The herein described process of making chloroform, which comprises preparing a homogeneous electrolyte consisting of carbon tetrachloride, a solvent thereof and dilute acid, passing an electric current from an anode to a cathode first through dilute acid only, then through a diaphragm and then through said electrolyte, thereby decomposing the acid of the electrolyte and liberating nascent hydrogen in the presence of carbon tetrachloride, reducing such carbon tetrachloride with such hydrogen to chloroform, and separating and recovering the chloroform.

4. The herein described process of making chloroform, which comprises preparing a homogeneous electrolyte consisting of carbon tetrachloride, a dilute acid, and a solvent capable of dissolving carbon tetrachloride and water, passing an electric current from an anode to a cathode through a diaphragm and through said electrolyte, thereby decomposing the acid and liberating nascent hydrogen in the presence of carbon tetrachloride, reducing such carbon tetrachloride with such hydrogen to chloroform, and separating the chloroform from the electrolyte and recovering the same.

5. The herein described method of making chloroform, which comprises dissolving one part by volume, of carbon tetrachloride in about two parts of substantially pure alcohol, together with about three-tenths of a part of dilute acid, passing a current of electricity from an anode through dilute acid, a diaphragm, and said carbon-tetrachloride-alcohol-acid solution to a cathode, thereby decomposing the acid of said solution and liberating nascent hydrogen in the presence of carbon tetrachloride of said solution, thereby reducing carbon tetrachloride to chloroform, and separating and recovering such chloroform.

In testimony whereof we have affixed our signatures.

HORACE G. BYERS.
WALLACE B. VAN ARSDEL.